US012731942B2

(12) United States Patent
Sago

(10) Patent No.: US 12,731,942 B2
(45) Date of Patent: Sep. 8, 2026

(54) CONNECTOR ASSEMBLY

(71) Applicant: SUMITOMO WIRING SYSTEMS, LTD., Mie (JP)

(72) Inventor: Ikki Sago, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 330 days.

(21) Appl. No.: 18/396,988

(22) Filed: Dec. 27, 2023

(65) Prior Publication Data

US 2024/0222903 A1 Jul. 4, 2024

(30) Foreign Application Priority Data

Jan. 4, 2023 (JP) ................................ 2023-000231

(51) Int. Cl.
*H01R 13/62* (2006.01)
*H01R 13/52* (2006.01)
*H01R 13/621* (2006.01)

(52) U.S. Cl.
CPC ......... *H01R 13/621* (2013.01); *H01R 13/521* (2013.01); *H01R 13/5216* (2013.01)

(58) Field of Classification Search
CPC ................ H01R 13/621; H01R 13/521; H01R 13/5216; H01R 13/5219; H01R 13/5202; H01R 13/502; H01R 13/40
See application file for complete search history.

(56) References Cited

U.S. PATENT DOCUMENTS 10,128,624 B2 * 11/2018 Tyler ................ H01R 13/62938
11,509,089 B1 * 11/2022 Atsushi .................. H01R 31/06
11,728,603 B2 * 8/2023 Skrzypczak ........ B60R 16/0238 439/135
11,735,856 B2 * 8/2023 Ambo .................... H01R 43/20 439/519
2005/0250373 A1 * 11/2005 Nakano ................ H01R 4/2433 439/417
2011/0086534 A1 * 4/2011 Lim ................... H01R 12/7082 439/345
2017/0025780 A1 * 1/2017 Kida ...................... H01R 13/50
2022/0140540 A1 * 5/2022 DeWitte ............. H01R 13/6582 439/217

FOREIGN PATENT DOCUMENTS

JP 2019-110026 A 7/2019

* cited by examiner

*Primary Examiner* — Truc T Nguyen
(74) *Attorney, Agent, or Firm* — Venjuris, P.C.

(57) ABSTRACT

A connector assembly is provided with a first connector to be fixed to a metal case and a second connector connectable to the first connector. The first connector includes a first housing and a first terminal. The second connector includes a second housing connectable to the first housing by being relatively moved along a connection direction with respect to the first housing, a second terminal connected to the first terminal in a housing connected state where the second housing is connected to the first housing, and a sealing rubber held in the second housing to stop water between the first and second housings in the housing connected state. The first housing includes a temporary holding portion for temporarily holding the second housing by a friction force with the sealing rubber in a pre-connected state before the housing connected state.

7 Claims, 8 Drawing Sheets

CONNECTOR ASSEMBLY

CROSS-REFERENCE TO RELATED APPLICATIONS

This application is based on and claims priority from Japanese Patent Application No. 2023-000231, filed on Jan. 4, 2023, with the Japan Patent Office, the disclosure of which is incorporated herein in its entirety by reference.

TECHNICAL FIELD

The present disclosure relates to a connector assembly.

BACKGROUND

Conventionally, a connector assembly is known which is provided with a first connector to be fixed to a base member such as a vehicle body panel or metal case and a second connector connectable to the first connector (see, for example, Japanese Patent Laid-open Publication No. 2019-110026). The first connector includes a first housing and a first terminal held in the first housing. Further, the second connector includes a second housing connectable to the first housing by being relatively moved along a connection direction with respect to the first housing, and a second terminal held in the second housing. The second housing includes a fixing hole penetrating along the connection direction. The second housing is fixed to the base member by a bolt passed through the fixing hole and screwed to a female screw of the base member.

SUMMARY

In the connector assembly as described above, an improvement in workability in assembling the first and second connectors is required. For example, in a configuration in which the first and second terminals are connected using a force along the connection direction generated when the bolt is screwed, a worker needs to, for example, screw the bolt while holding the second housing by hand. In such a case, there has been a problem of poor workability in the connector assembly as described above.

The present disclosure aims to provide a connector assembly enabling an improvement in workability at the time of assembly.

The present disclosure is directed to a connector assembly with a first connector to be fixed to a base member and a second connector connectable to the first connector, the first connector including a first housing and a first terminal held in the first housing, the second connector including a second housing connectable to the first housing by being relatively moved along a connection direction with respect to the first housing, a second terminal held in the housing, the second terminal being connected to the first terminal in a housing connected state where the second housing is connected to the first housing, and a sealing rubber held in the second terminal, the sealing rubber stopping water between the first and second housings in the housing connected state, and the first housing including a temporary holding portion for temporarily holding the second housing by a friction force with the sealing rubber in a pre-connected state before the housing connected state.

According to the connector assembly of the present disclosure, workability at the time of assembly can be improved.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
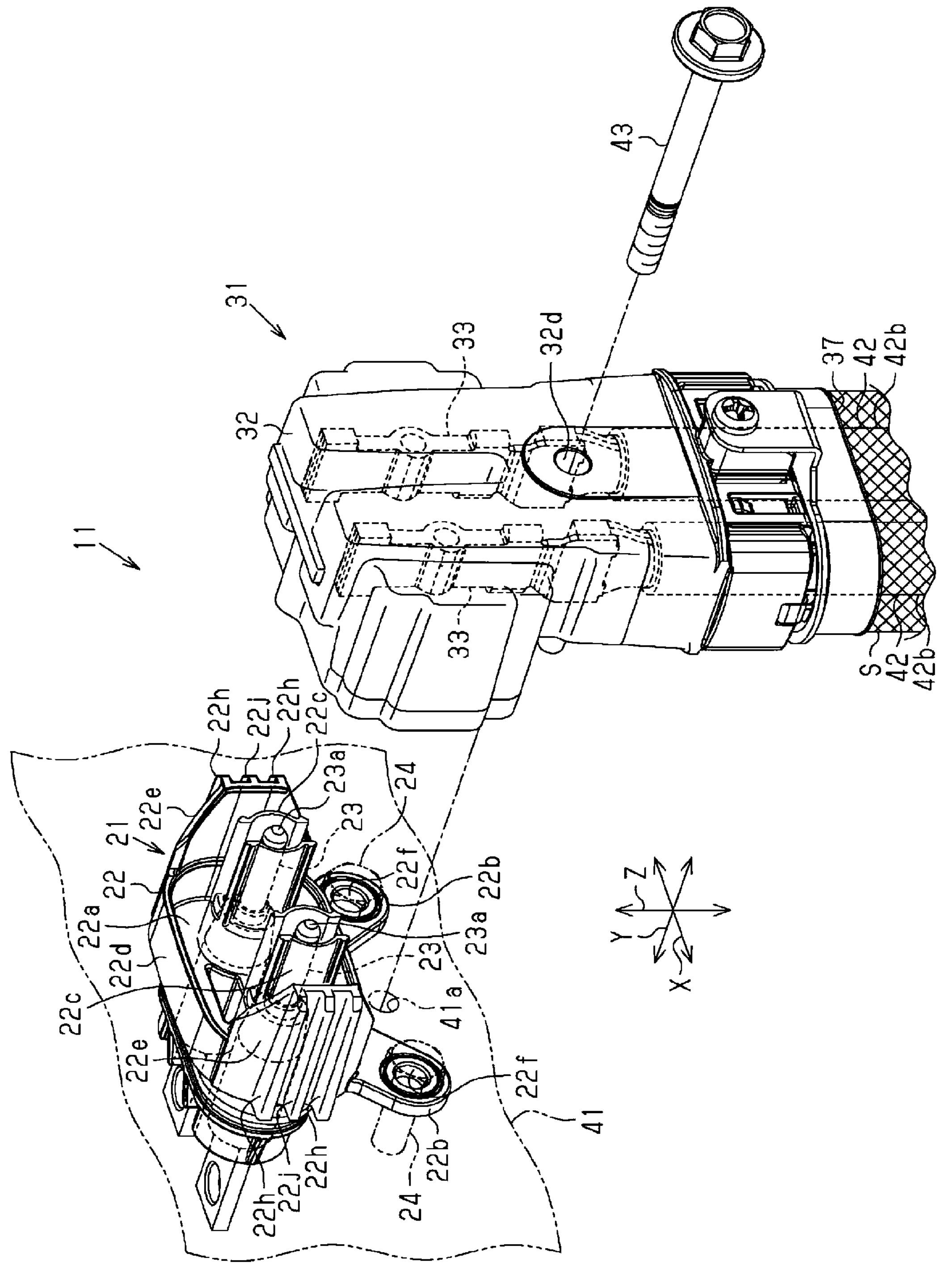
FIG. 1 is an exploded perspective view of a connector assembly in one embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

[1] The connector assembly of the present disclosure is provided with a first connector to be fixed to a base member and a second connector connectable to the first connector, the first connector including a first housing and a first terminal held in the first housing, the second connector including a second housing connectable to the first housing by being relatively moved along a connection direction with respect to the first housing, a second terminal held in the housing, the second terminal being connected to the first terminal in a housing connected state where the second housing is connected to the first housing, and a sealing rubber held in the second terminal, the sealing rubber stopping water between the first and second housings in the housing connected state, and the first housing including a temporary holding portion for temporarily holding the second housing by a friction force with the sealing rubber in a pre-connected state before the housing connected state.

According to this configuration, since the first housing includes the temporary holding portion for temporarily holding the second housing by the friction force with the sealing rubber in the pre-connected state before the housing connected state, workability at the time of assembly is good. Note that, for example, if the first housing and the second housing are made of resin and made of metal, each component needs to be manufactured with high accuracy to obtain a temporarily holdable structure without using the sealing rubber. In contrast, since the friction force with the sealing rubber capable of absorbing manufacturing errors is used, each component needs not be manufactured with high accuracy.

[2] In [1] described above, the connector assembly may be provided with a bolt, and the second housing may include a fixing hole penetrating along the connection direction and be fixed to the base member by the bolt screwed to a female screw provided in the base member through the fixing hole.

According to this configuration, since the second housing is fixed to the base member by the bolt screwed to the female screw through the fixing holed, the second housing can be, for example, temporarily held on the first housing before the bolt is screwed. Thus, a worker can perform, for example, an operation of screwing the bolt with his/her hand taken off the second housing. Thus, workability during an assembling operation is good.

[3] In [1] or [2] described above, the second housing may include an inner tube portion having the sealing rubber disposed on an outer peripheral surface, the first housing may include an outer tube portion having the sealing rubber held in close contact with an inner peripheral surface in the housing connected state, and the temporary holding portion may be provided to project along the connection direction from the outer tube portion and the sealing rubber may be brought into contact with an inner peripheral surface of the temporary holding portion in the pre-connected state.

According to this configuration, since the temporary holding portion is provided to project along the connection direction from the outer tube portion and contacts the sealing rubber in the pre-connected state, the second housing can be temporarily held by the friction force of the sealing rubber by a simple configuration.

[4] In [3] described above, the temporary holding portion may be set to contact the sealing rubber at a smaller surface pressure than the outer tube portion in close contact with the sealing rubber.

According to this configuration, since the temporary holding portion is set to contact the sealing rubber at the smaller surface pressure than the outer tube portion in close contact with the sealing rubber, it is suppressed that the sealing rubber is turned up from the inner tube portion when the pre-connected state is set. Further, in the housing connected state, the outer tube portion contacts the sealing rubber at a large surface pressure, whereby water stop performance is good.

[5] In [3] or [4] described above, the second terminal may extend along an axial direction orthogonal to the connection direction and a plurality of the second terminals may be provided in a width direction orthogonal to the connection direction and the axial direction, and the temporary holding portion may project along the connection direction from both sides in the width direction of the outer tube portion.

According to this configuration, since the temporary holding portion projects along the connection direction from the both sides in the width direction of the outer tube portion, the temporary holding portion can be arranged to avoid the second terminal extending along the axial direction in the housing connected state. That is, if the temporary holding portion projects, for example, from the entire periphery of the outer tube portion, the second housing needs to be formed long in the connection direction to prevent contact with the second terminal in the housing connected state. However, this can be avoided. In this way, the connector assembly can be reduced in size along the connection direction.

[6] In [5] described above, the temporary holding portion may include a side rib projecting outward in the width direction and extending along the connection direction, and the second housing may include an engaging portion engageable with the side rib in the axial direction in the pre-connected state.

According to this configuration, the temporary holding portion includes the side rib projecting outward in the width direction and extending along the connection direction, and the second housing includes the engaging portion engageable with the side rib in the axial direction in the pre-connected state. Thus, the rotation of the second housing is stopped in the pre-connected state. That is, the second housing is prevented from being rotated about an axis along the connection direction with respect to the first housing in the pre-connected state. Note that this engagement fulfills an auxiliary function in temporarily holding the second housing on the first housing.

[7] In [6] described above, the side rib may continuously extend to an outer side in the width direction of the outer tube portion along the connection direction.

According to this configuration, since the side rib continuously extends to the outer side in the width direction of the outer tube portion, the second housing is strongly prevented from being rotated about the axis along the connection direction with respect to the first housing in the housing connected state.

Details of Embodiment of Present Disclosure

A specific example of a connector assembly of the present disclosure is described below with reference to the drawings. For the convenience of description, some components may be shown in an exaggerated or simplified manner in each drawing. Further, a dimension ratio of each part may be different in each figure. “Parallel” and “orthogonal” in this specification mean not only strictly parallel and orthogonal, but also substantially parallel and orthogonal within a range in which functions and effects in this embodiment are achieved. Note that the present invention is not limited to these illustrations, but is represented by claims and intended to include all changes in the scope of claims and in the meaning and scope of equivalents.

[Configuration of Connector Assembly 11]

Figure 2:
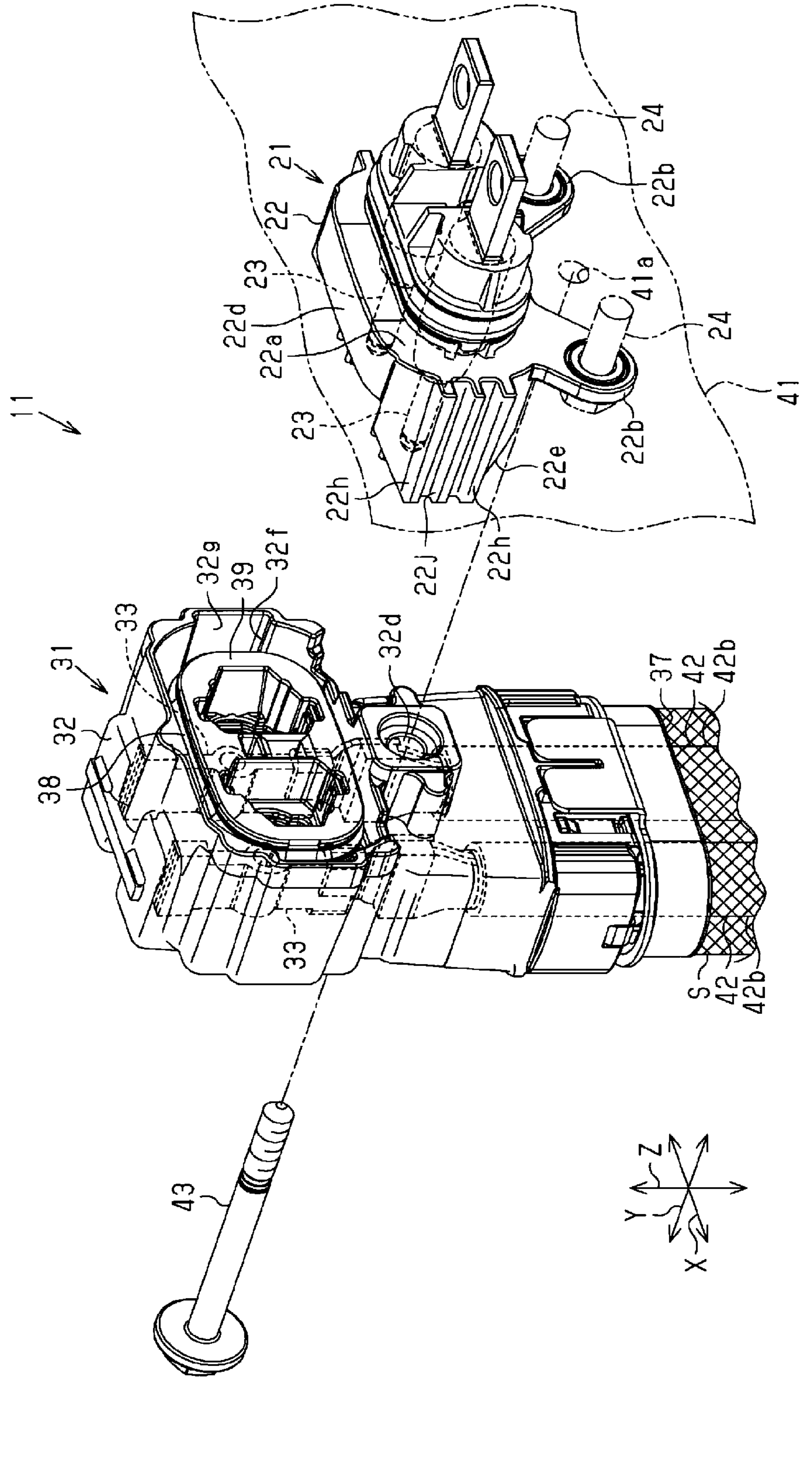
FIG. 2 is an exploded perspective view of the connector assembly in the embodiment.

As shown in FIGS. 1 and 2, a connector assembly 11 is provided with a first connector 21 and a second connector 31 connectable to the first connector 21. The connector 11 is provided in a vehicle. For example, the first connector 21 is fixed to a metal case 41 serving as a base member in the vehicle. Further, the second connector 31 is, for example, fixed to end parts of two wires 42.

Note that a first axis X, a second axis Y orthogonal to the first axis X and a third axis Z orthogonal to the first and second axes X, Y are shown in figures. In the description of this embodiment, a direction along the first axis X is referred to as a width direction, a direction along the second axis Y is referred to as a connection direction, and a direction along the third axis Z is referred to as an axial direction.

[Configuration of First Connector 21]

As shown in FIG. 1, the first connector 21 includes a first housing 22 and two first terminals 23 held in the first housing 22. The first housing 22 is made of resin. The first housing 22 includes a base portion 22*a*, fixing portions 22*b*, terminal protecting portions 22*c*, an outer tube portion 22*d* and temporary holding portions 22*e*.

The base portion 22*a* is in the form of a plate. The base portion 22*a* has a rectangular shape long in the width direction when viewed from the connection direction and corners thereof are chamfered into an arc shape. The two first terminals 23 are held side by side in the width direction on the base portion 22*a*. The first terminal 23 extends along the connection direction. A cap 23*a* made of resin or rubber is fixed to the tip of the first terminal 23. A pair of the fixing portions 22*b* are provided to extend from parts of the outer edge of the base portion 22*a*. The fixing portion 22*b* is provided with a through hole 22*f* penetrating along the connection direction. The first housing 22 is fixed to the metal case 41 by fixing bolts 24 screwed to unillustrated female screws provided in the metal case 41 through the through holes 22*f*.

The terminal protecting portions 22*c* are provided to project along the connection direction from parts around the first terminals 23 on the base portion 22*a*. The terminal protecting portions 22*c* of this embodiment are provided to cover the first terminals 23 while being slightly separated from the first terminals 23 in the width direction.

Figure 3:
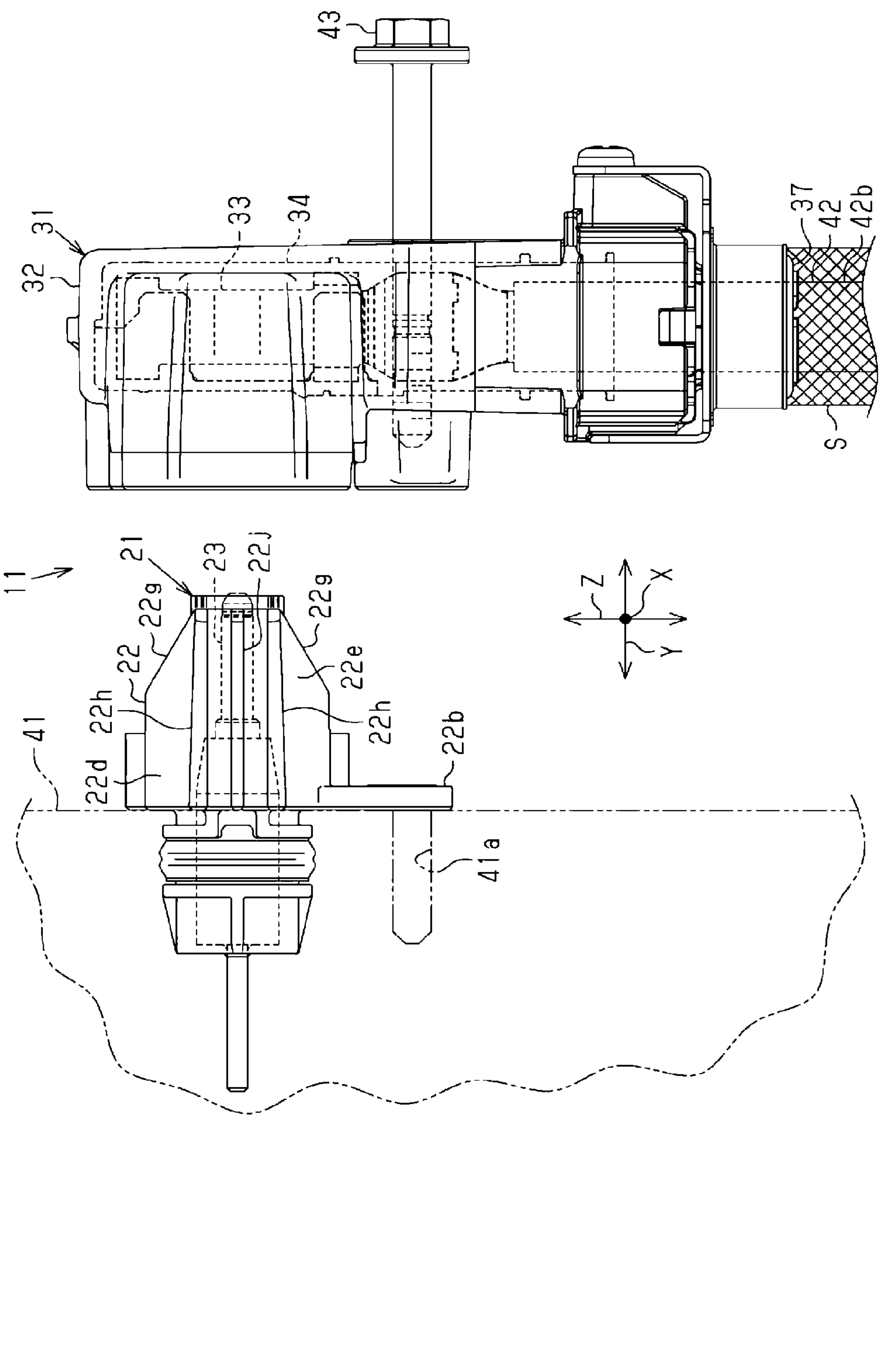
FIG. 3 is an exploded side view of the connector assembly in the embodiment.

The outer tube portion 22*d* is provided to project along the connection direction from the entire periphery of the outer edge of the base portion 22*a*. The temporary holding portions 22*e* are provided to project along the connection direction from the outer tube portion 22*d*. The temporary holding portions 22*e* of this embodiment project along the connection direction from both sides in the width direction of the outer tube portion 22*d*. Further, as shown in FIG. 3, the temporary holding portion 22*e* includes inclined portions 22*g* approaching each other toward a tip on both sides in the axial direction of a tip part.

Further, the temporary holding portion 22*e* includes side ribs 22*h* projecting outward in the width direction and extending along the connection direction. Further, the temporary holding portion 22*e* includes a reinforcement rib 22*j* projecting outward in the width direction and extending along the connection direction. A pair of the side ribs 22*h* are provided at positions near both sides in the axial direction of the temporary holding portion 22*e*. The reinforcement rib 22*j* is provided in a center in the axial direction of the temporary holding portion 22*e* and between the pair of side ribs 22*h*. The side ribs 22*h* and the reinforcement rib 22*j* continuously extend along the connection direction up to an outer side in the width direction of the outer tube portion 22*d*. The side ribs 22*h* and the reinforcement rib 22*j* are formed entirely on the temporary holding portion 22*e* and the outer tube portion 22*d* in the connection direction.

[Configuration of Second Connector 31]

As shown in FIGS. 1 and 2, the second connector 31 includes a second housing 32 and second terminals 33. The second housing 32 is connectable to the first housing 22 by being relatively moved along the connection direction with respect to the first housing 22. The second terminals 33 are held in the second housing 32, and connected to the first terminals 23 in a housing connected state (see FIGS. 5 and 6) where the second housing 32 is connected to the first housing 22.

Figure 4:
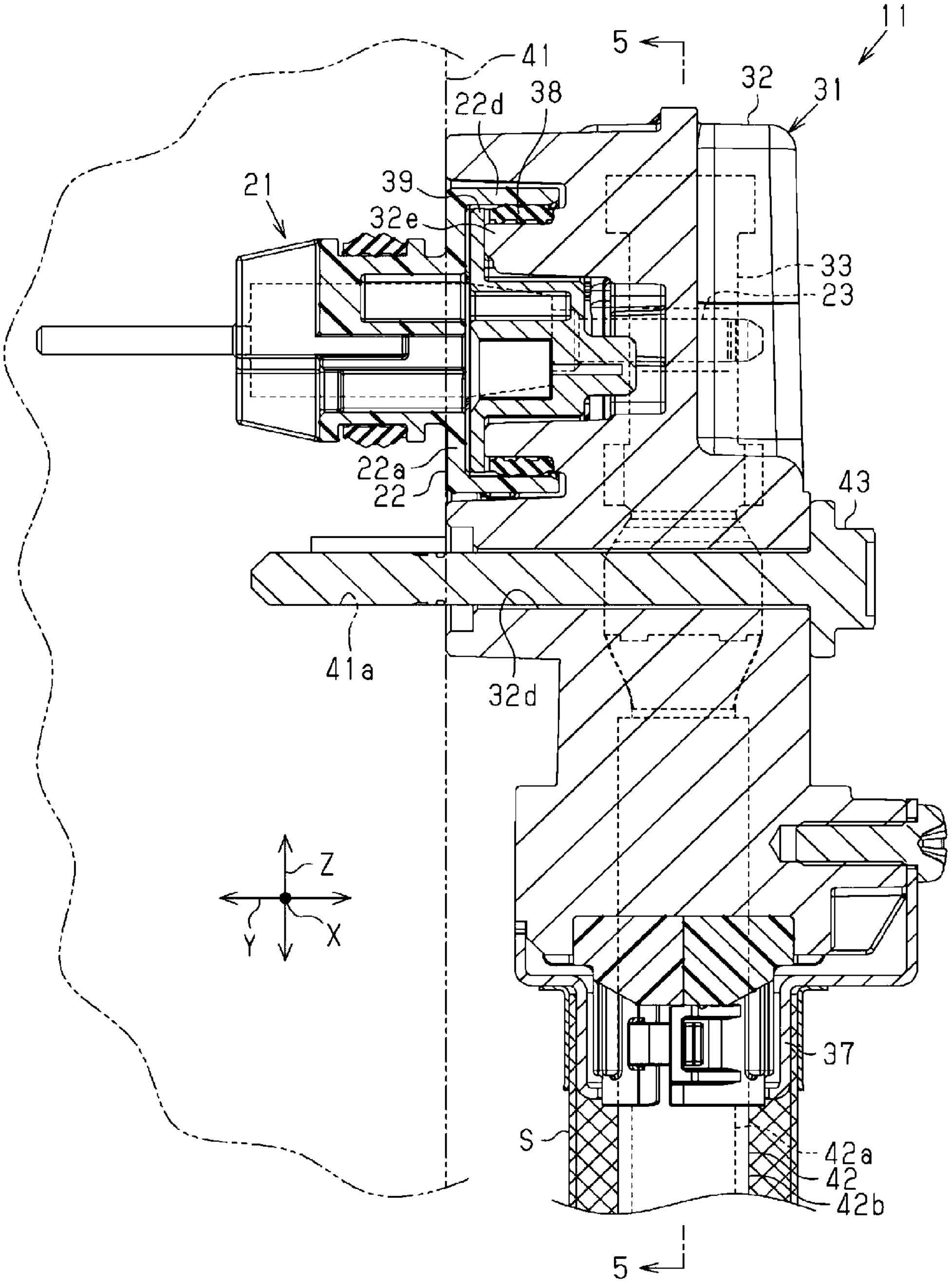
FIG. 4 is a section of the connector in the embodiment.
Figure 5:
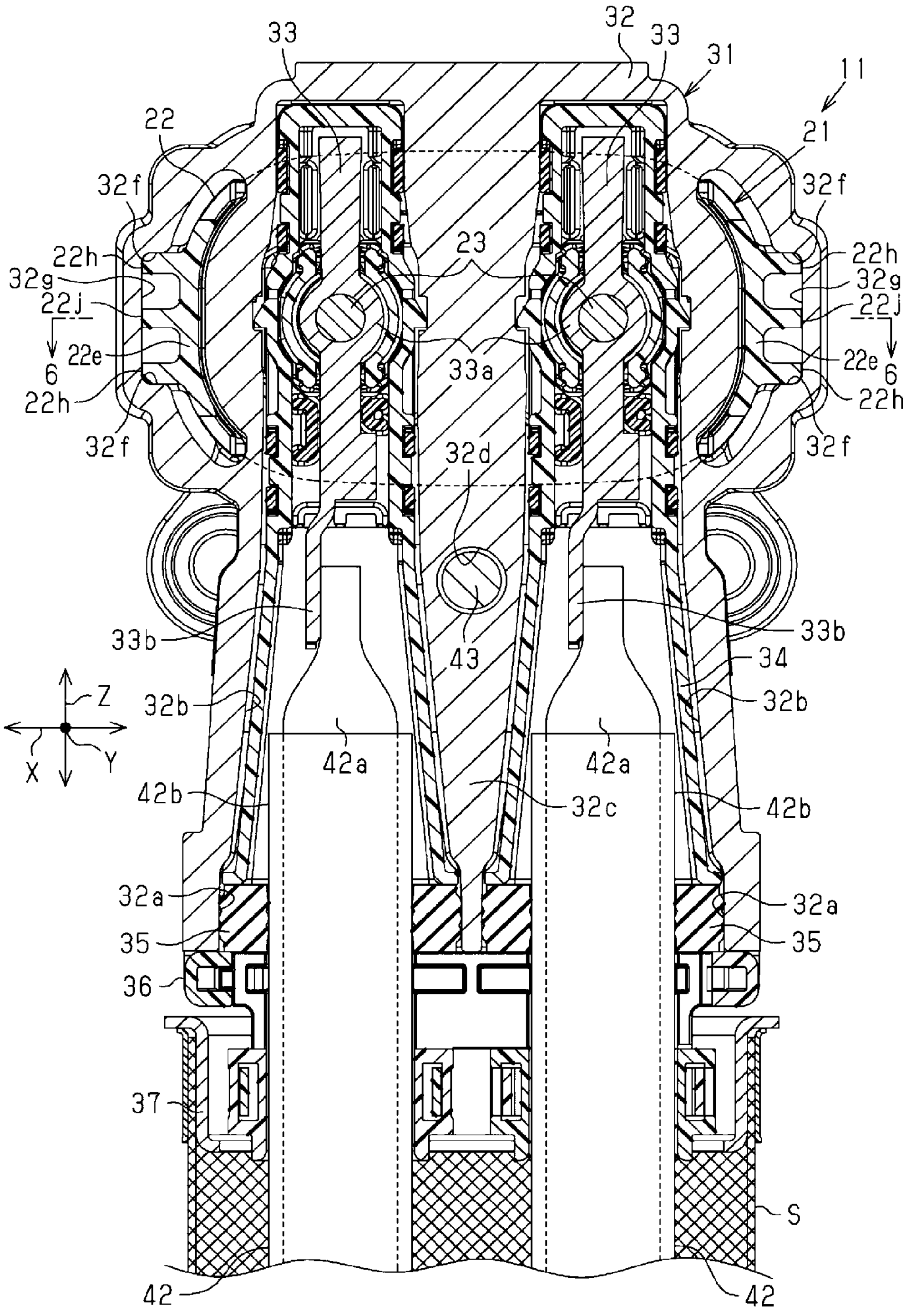
FIG. 5 is a section along 5-5 in FIG. 4.
Figure 6:
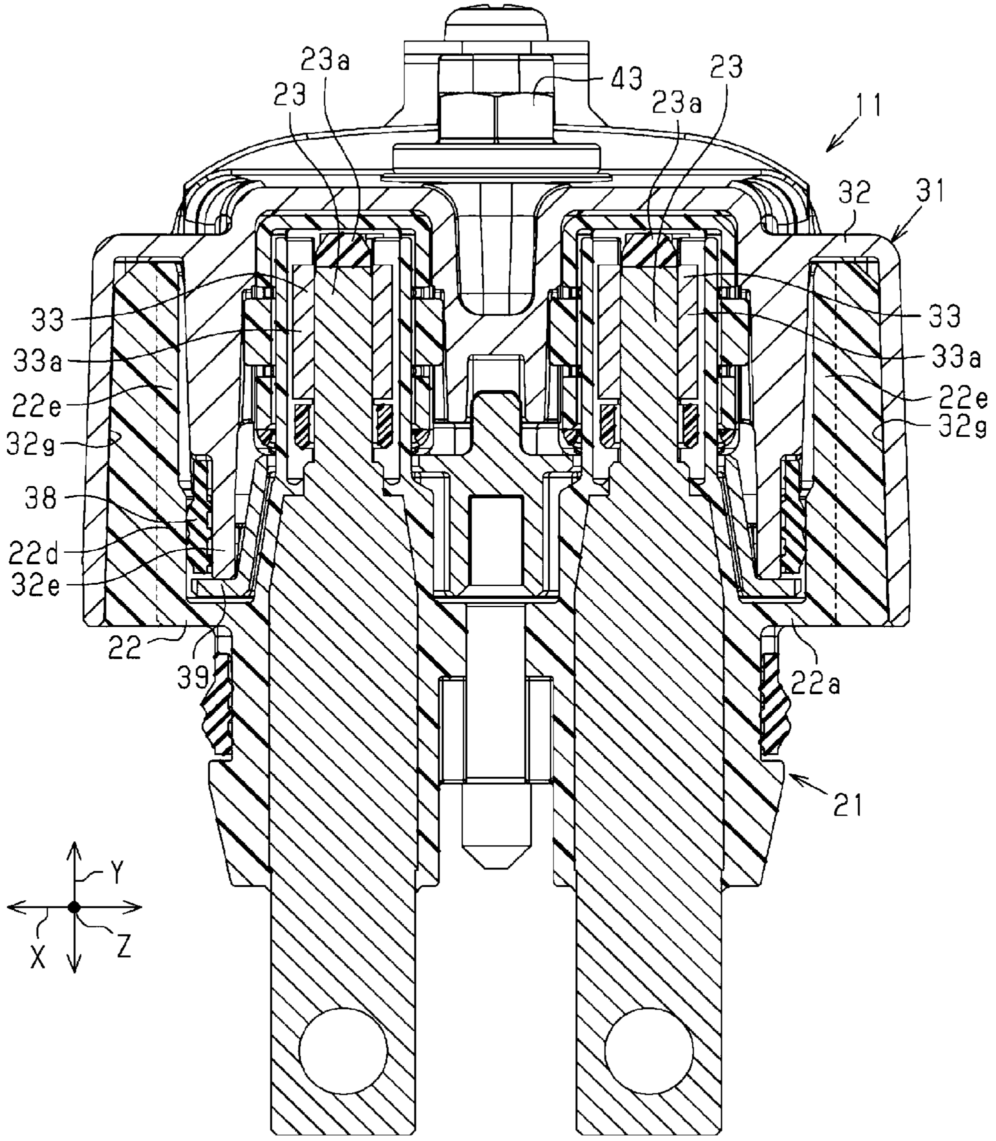
FIG. 6 is a section along 6-6 in FIG. 5.

In particular, as shown in FIG. 5, the second connector 31 is further provided with resin housings 34, rubber plugs 35, a retainer 36 and a metal bracket 37. Further, as shown in FIGS. 4 and 6, the second connector 31 is provided with a sealing rubber 38.

The wire 42 includes a core wire 42*a* and an insulation coating 42*b*. The second terminal 33 is connected to an end part of the core wire 42*a* exposed from the insulation coating 42*b*. The second terminal 33 extends along the axial direction, and two second terminals 33 are provided to correspond to the wires 42 in the width direction. The second terminal 33 includes a terminal fitting portion 33*a* fittable to the first terminal 23 and a plate-like terminal connecting portion 33*b* to be connected to the core wire 42*a*. Note that the second terminal 33 is formed by bending a metal plate material, and schematically shown in figures without showing details thereof. Further, in this embodiment, the terminal connecting portion 33*b* and the core wire 42 are resistance-welded.

The resin housing 34 is formed into a tubular shape to cover the exposed core wire 42*a* and second terminal 33. Note that the resin housing 34 includes an opening for allowing the passage of the first terminal 23 to be fit to the terminal fitting portion 33*a*.

The second housing 32 is a metal shell made of metal and having an electromagnetic shielding function. The second housing 32 is formed to cover the resin housings 34. The second housing 32 includes housing accommodating portions 32*b* extending toward a tip in the axial direction while including openings 32*a* in a base end part in the axial direction. The housing accommodating portion 32*b* is formed into a shape capable of accommodating the resin housing 34 almost without any gap in conformity with the shape of the resin housing 34. Two housing accommodating portions 32*b* are provided side by side in the width direction to correspond to the number of the resin housings 34.

The rubber plug 35 is formed into a tubular shape and interposed between the insulation coating 42*b* and the opening 32*a*. In this way, the rubber plug 35 prevents the intrusion of liquids into the second connector 31 along the insulation coating 42*b*.

The retainer 36 is made of resin. The retainer 36 is locked to the second housing 32 and prevents the detachment of the rubber plugs 35 from the openings 32*a*.

The metal bracket 37 is connected to a collective shield member S serving as a shield member for covering the insulation coatings 42*b* and connected to the second housing 32. In particular, the shield member of this embodiment is the tubular collective shield member S for collectively covering a plurality of the insulation coatings 42*b*. Further, the collective shield member S of this embodiment is a braided member formed by braiding electrically conductive strands made of copper alloy, aluminum alloy or the like into a tubular shape. The metal bracket 37 is connected to the second housing 32 while being connected to the entire periphery of the collective shield member S.

Further, the second housing 32 includes a partition wall 32*c* between the two housing accommodating portions 32*b*. The partition wall 32*c* is formed in the entire second housing 32 in the axial direction. The partition wall 32*c* is provided with a fixing hole 32*d* penetrating along the connection direction. That is, the fixing hole 32*d* is provided between the plurality of wires 42 in the width direction, in which the plurality of wires 42 are provided side by side. In other words, the fixing hole 32*d* is provided at a position in the width direction between the position of one wire 42 in the width direction and the position of the other wire 42 in the width direction. As shown in FIG. 4, the second housing 32 can be fixed to the metal case 41 by a bolt 43 screwed to a female screw 41*a* provided in the metal case 41 through the fixing hole 32*d*. The second housing 32 is connected to the first housing 22 by being relatively moved along the connection direction with respect to the first housing 22 by a force along the connection direction generated when the bolt 43 is screwed.

As shown in FIGS. 4 and 6, the second housing 32 includes an inner tube portion 32*e* to be fit inside the outer tube portion 22*d* of the first housing 22 in the housing connected state. The sealing rubber 38 is arranged on the outer peripheral surface of the inner tube portion 32*e*. The sealing rubber 38 is formed into an annular shape, externally fit to the inner tube portion 32*e* and prevented from being detached from the inner tube portion 32*e* by a front retainer 39 fit to the inner tube portion 32*e*. The sealing rubber 38 stops water between the first and second housings 22, 32 by being held in close contact with the inner peripheral surface of the inner tube portion 22*d* in the housing connected state.

Further, as shown in FIG. 5, the second housing 32 includes engaging portions 32*f* engageable with the side ribs 22*h* in the axial direction. In particular, the second housing 32 includes recesses 32*g* capable of collectively accommodating the side ribs 22*h* and the reinforcement ribs 22*j*, and a pair of side surfaces constituting the recess 32*g* constitute the engaging portions 32*f*. The engaging portions 32*f* are engageable with the side ribs 22*h* in a pre-connected state (see FIGS. 7 and 8) before the housing connected state.

Figure 7:
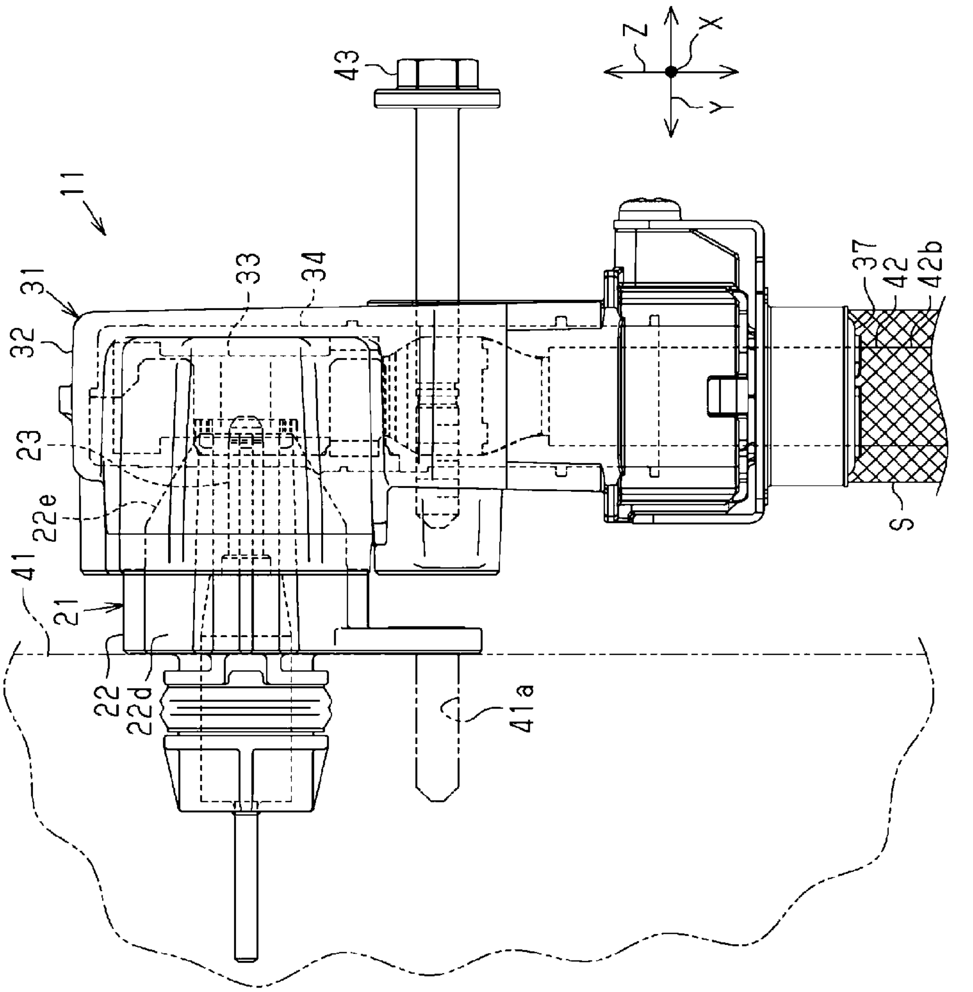
FIG. 7 is a side view of the connector assembly in a pre-connected state in the embodiment.
Figure 8:
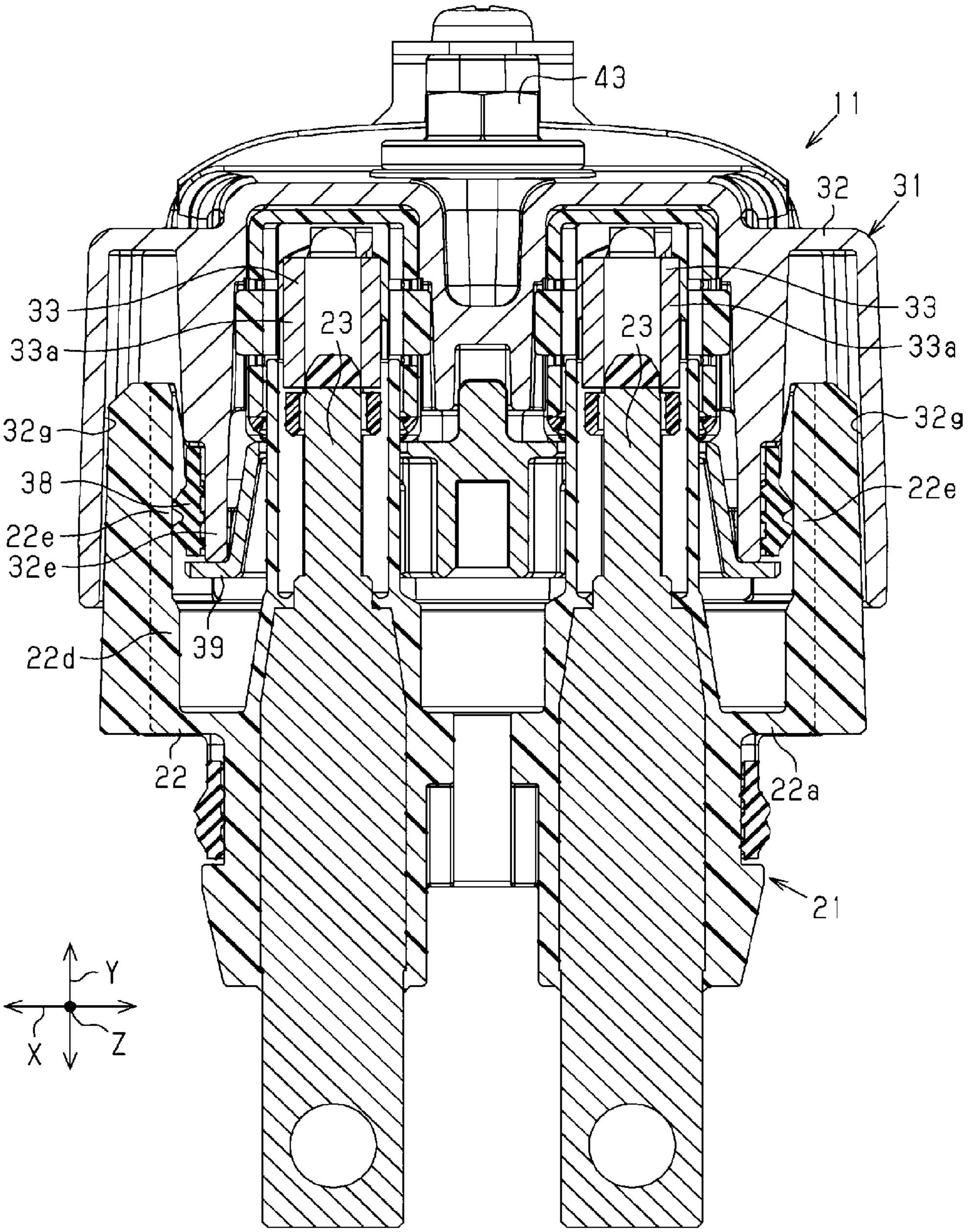
FIG. 8 is a section of the connector assembly in the pre-connected state in the embodiment.

Here, as shown in FIG. 8, the temporary holding portions 22*e* are set to be able to temporarily hold the second housing 32 by a friction force with the sealing rubber 38 in the pre-connected state before the housing connected state. The friction force with the sealing rubber 38 is a resistance force against relative movements of the sealing rubber 38 and the temporary holding portions 22*e* in contact with the sealing rubber 38. The temporary holding portions 22*e* temporarily hold the second housing 32 by the contact of the sealing rubber 38 with the inner peripheral surfaces thereof in the pre-connected state. Note that temporary holding mentioned here means such holding that the second housing 32 is not detached from the first housing 22 even if a worker takes his/her hand off the second housing 32 in the pre-connected state when the connection direction is a horizontal direction as shown in FIG. 7.

Further, the temporary holding portions 22*e* are set to contact the sealing rubber 38 at a smaller surface pressure than the outer tube portion 22*d* in close contact with the sealing rubber 38 (see FIG. 6). That is, the temporary holding portions 22*e* are so formed that an interval between the facing inner peripheral surfaces of the temporary holding portions 22*e* is larger than an interval between parts of the inner peripheral surface of the outer tube portion 22*d* facing each other in the same direction. In other words, the temporary holding portions 22*e* and the outer tube portion 22*d* are formed to more squeeze the sealing rubber 38 in the housing connected state (see FIG. 6) than in the pre-connected state (see FIG. 8).

Further, in this embodiment, the first and second terminals 23, 33 are set to be connected using a large force along the connection direction generated when the bolt 43 is screwed. That is, the first and second terminals 23, 33 are so dimensioned that the connection thereof is difficult merely by the worker gripping the second housing 32 and pushing the second housing 32 in the connection direction. By such dimensioning, contact resistance between the first and second terminals 23, 33 is small.

Next, functions of the connector assembly 11 configured as described above are described.

As shown in FIGS. 7 and 8, in assembling the first and second connectors 21, 31, the worker first grips the second housing 32 and relatively moves the second housing 32 along the connection direction with respect to the first housing 22, thereby setting the pre-connected state before the housing connected state.

In the pre-connected state, the second housing 32 is temporarily held on the first housing 22 by a friction force between the temporary holding portions 22*e* and the sealing rubber 38. That is, in the pre-connected state, even if the worker takes his/her hand off the second housing 32, the second housing 32 is not detached from the first housing 22.

Then, for example, the worker screws the bolt 43 passed through the fixing hole 32*d* to the female screw 41*a* of the metal case 41 using a tool.

Then, the second and first housings 32, 22 are connected and the second and first terminals 32, 23 are connected by a large force along the connection direction generated when the bolt 43 is screwed. Further, at this time, the sealing rubber 38 is held in close contact with the outer peripheral surface of the inner tube portion 32*e* and the inner peripheral surface of the outer tube portion 22*d*, whereby water is stopped between the first and second housings 22, 32.

Further, the collective shield member S is electrically connected and grounded to the metal case 41 via the metal bracket 37, the second housing 32 and the bolt 43. Thus, the emission of electromagnetic noise from the wires 42 and the second terminals 33 covered by the collective shield member S, the metal bracket 37 and the second housing 32 is satisfactorily suppressed.

Next, effects of the above embodiment are described below.

(1) Since the first housing 22 includes the temporary holding portions 22*e* for temporarily holding the second housing 32 by a friction force with the sealing rubber 38 in the pre-connected state before the housing connected state, workability at the time of assembly is good. Note that, for example, if the first housing 22 and the second housing 32 are made of resin and made of metal as in this embodiment, each component needs to be manufactured with high accuracy to obtain a temporarily holdable structure without using the sealing rubber 38. In contrast, since the friction force with the sealing rubber 38 capable of absorbing manufacturing errors is used, each component needs not be manufactured with high accuracy.

(2) The second housing 32 is fixed to the metal case 41 by the bolt 43 screwed to the female screw 41*a* through the fixing hole 32*d*. Thus, the second housing 32 can be, for example, temporarily held on the first housing 22 before the bolt 43 is screwed. Thus, the worker can perform, for example, an operation of screwing the bolt 43 with his/her hand taken off the second housing 32. Thus, workability during an assembling operation is good.

(3) The temporary holding portions 22*e* are provided to project along the connection direction from the outer tube portion 22*d* having the sealing rubber 38 held in close contact with the inner peripheral surfaces thereof in the housing connected state, and contact the sealing rubber 38 in the pre-connected state. Thus, the second housing 32 can be temporarily held by a friction force of the sealing rubber 38 by a simple configuration.

(4) Since the temporary holding portions 22*e* are set to contact the sealing rubber 38 at a smaller surface pressure than the outer tube portion 22*d* in close contact with the sealing rubber 38, it is suppressed that the sealing rubber 38 is turned up from the inner tube portion 32*e* when the pre-connected state is set. Further, in the housing connected state, the outer tube portion 22*d* is in contact with the sealing rubber 38 at a large surface pressure, whereby water stop performance is good.

(5) Since the temporary holding portions 22*e* project along the connection direction from the both sides in the width direction of the outer tube portion 22*d*, the temporary holding portions 22*e* can be arranged to avoid the second terminals 33 extending along the axial direction in the housing connected state. That is, if the temporary holding portions 22*e* project, for example, from the entire periphery of the outer tube portion 22*d*, the second housing 32 needs to be formed long in the connection direction to prevent contact with the second terminals 33 in the housing connected state. However, this can be avoided. In this way, the connector assembly 11 can be reduced in size along the connection direction.

(6) The temporary holding portions 22*e* include the side ribs 22*h* projecting outward in the width direction and extending along the connection direction, and the second housing 32 includes the engaging portions 32*f* engageable with the side ribs 22*h* in the axial direction in the pre-connected state. Thus, the rotation of the second housing 32 is stopped in the pre-connected state. That is, the second housing 32 is prevented from being rotated about an axis along the connection direction with respect to the first housing 22 in the pre-connected state. Note that this engagement fulfills an auxiliary function in temporarily holding the second housing 32 on the first housing 22.

(7) Since the side ribs 22*h* continuously extend to the outer sides in the width direction of the outer tube portion 22*d*, the second housing 32 is strongly prevented from being rotated about the axis along the connection direction with respect to the first housing 22 in the housing connected state.

This embodiment can be modified and carried out as follows. This embodiment and the following modifications can be carried out in combination without technically contradicting each other.

- Although the second housing 32 is fixed to the metal case 41 by the bolt 43 screwed to the female screw 41*a* through the fixing hole 32*d* in the above embodiment, there is no limitation to this. The second housing 32 may be fixed to the metal case 41 by another structure. Even if the second housing 32 is fixed to the metal case 41 by another structure, the second housing 32 can be temporarily held, wherefore workability during the assembling operation is good.
- Although the second housing 32 includes the inner tube portion 32*e* having the sealing rubber 38 disposed on the outer peripheral surface in the above embodiment, there is no limitation to this. For example, the second housing 32 may include a tube portion having a sealing rubber disposed on an inner peripheral surface. Note that, of course in this case, the configurations of the outer tube portion 22*d* and the temporary holding portions 22*e* of the first housing 22 also need to be changed.
- Although the temporary holding portions 22*e* are provided to project along the connection direction from the outer tube portion 22*d* in the above embodiment, another configuration may be adopted if the temporary holding portions 22*e* can contact the sealing rubber 38 in the pre-connected state.
- Although the temporary holding portions 22*e* are set to contact the sealing rubber 38 at the smaller surface pressure than the outer tube portion 22*d* in close contact with the sealing rubber 38 in the above embodiment, there is no limitation to this. For example, the temporary holding portions 22*e* may contact the sealing rubber 38 at the same surface pressure as the outer tube portion 22*d*. Further, the temporary holding portions 22*e* may contact the sealing rubber 38 at a larger surface pressure than the outer tube portion 22*d* in close contact with the sealing rubber 38.
- Although the temporary holding portions 22*e* project along the connection direction from the both sides in the width direction of the outer tube portion 22*d* in the above embodiment, there is no limitation to this. For example, the temporary holding portions 22*e* may project from the entire periphery of the outer tube portion 22*d*. Note that, in this case or the like, the second connector 31 may be, for example, configured such that the second terminals 33 extend along the connection direction. For example, if the second terminals 33 extend along the connection direction in the second connector 31, the temporary holding portions 22*e* can be prevented from contacting the second terminals 33 even if projecting from the entire periphery of the outer tube portion 22*d*. Thus, the enlargement of the connector assembly 11 along the connection direction can be avoided.
- Although the temporary holding portions 22*e* include the side ribs 22*h* and the second housing 32 includes the engaging portions 32*f* engageable with the side ribs 22*h* in the pre-connected state in the above embodiment, there is no limitation to this. The side ribs 22*h* and the engaging portions 32*f* may not be included. Further, the number of the side ribs 22*h* may be changed. Note that, of course in this case, the number of the engaging portions 32*f* also needs to be changed.
- Although the side ribs 22*h* continuously extend to the outer sides in the width direction of the outer tube portion 22*d* in the above embodiment, there is no limitation to this. The side ribs 22*h* may be provided only on the temporary holding portions 22*e*.
- Although the temporary holding portions 22*e* include the reinforcement ribs 22*j* in the above embodiment, there is no limitation to this and the reinforcement ribs 22*j* may not be included. Further, the number of the reinforcement ribs 22*j* may be changed.
- Although the second housing 32 is a metal shell in the above embodiment, there is no limitation to this and the second housing 32 may be made of resin. The second connector 31 may not have the electromagnetic shielding function. In such a case, the insulation coatings 42*b* may not be covered by the collective shield member S.
- Although the fixing hole 32*d* is provided between the plurality of wires 42 in the width direction in the above embodiment, there is no limitation to this and the fixing hole 32*d* may be provided at another position. For example, the fixing hole 32*d* may be provided in a fixing portion projecting outward in the axial or width direction of the second housing 32.
- Although the second connector 31 is fixed to the end parts of the two wires 42 in the above embodiment, there is no limitation to this and the second connector 31 may be fixed to end parts of three or more wires. Note that, in this case, the numbers of the first terminals 23, the second terminals 33, the resin housings 34 and the rubber plugs 35 need to be changed according to the number of the wires 42.
- Although the base member is the metal case 41 in the above embodiment, there is no limitation to this and another base member may be adopted. For example, the metal case 41 may be another base member such as a vehicle panel.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector assembly, comprising:
a first connector to be fixed to a base member; and
a second connector connectable to the first connector,
the first connector including:
a first housing; and
a first terminal held in the first housing,
the second connector including:
a second housing connectable to the first housing by being relatively moved along a connection direction with respect to the first housing;
a second terminal held in the second housing, the second terminal being connected to the first terminal in a housing connected state where the second housing is connected to the first housing; and
a sealing rubber held in the second housing, the sealing rubber stopping water between the first and second housings in the housing connected state, and
the first housing including a temporary holding portion for temporarily holding the second housing by a friction force with the sealing rubber in a pre-connected state before the housing connected state,
wherein the second housing includes an inner tube portion having the sealing rubber surrounding at least a part of an outer peripheral surface of the inner tube portion in the pre-connected state.

2. The connector assembly of claim 1, comprising a bolt, wherein the second housing includes a fixing hole penetrating along the connection direction and is fixed to the base member by the bolt screwed to a female screw provided in the base member through the fixing hole.

3. A connector assembly, comprising:
a first connector to be fixed to a base member; and
a second connector connectable to the first connector,
the first connector including:
a first housing; and
a first terminal held in the first housing,
the second connector including:
a second housing connectable to the first housing by being relatively moved along a connection direction with respect to the first housing;
a second terminal held in the second housing, the second terminal being connected to the first terminal in a housing connected state where the second housing is connected to the first housing; and
a sealing rubber held in the second housing, the sealing rubber stopping water between the first and second housings in the housing connected state, and
the first housing including a temporary holding portion for temporarily holding the second housing by a friction force with the sealing rubber in a pre-connected state before the housing connected state,
wherein:
the second housing includes an inner tube portion having the sealing rubber disposed on an outer peripheral surface,
the first housing includes an outer tube portion having the sealing rubber held in close contact with an inner peripheral surface in the housing connected state, and
the temporary holding portion is provided to project along the connection direction from the outer tube portion and the sealing rubber is brought into contact with an inner peripheral surface of the temporary holding portion in the pre-connected state.

4. The connector assembly of claim 3, wherein a surface pressure between the temporary holding portion and the sealing rubber in the pre-connected state is smaller than a surface pressure between the outer tube portion and the sealing rubber in the housing connected state.

5. The connector assembly of claim 3, wherein:
the second terminal extends along an axial direction orthogonal to the connection direction and a plurality of the second terminals are provided in a width direction orthogonal to the connection direction and the axial direction, and
the temporary holding portion projects along the connection direction from both sides in the width direction of the outer tube portion.

6. The connector assembly of claim 5, wherein:
the temporary holding portion includes a side rib projecting outward in the width direction and extending along the connection direction, and
the second housing includes an engaging portion engageable with the side rib in the axial direction in the pre-connected state.

7. The connector assembly of claim 6, wherein the side rib continuously extends to an outer side in the width direction of the outer tube portion along the connection direction.

* * * * *